D. CONEKIN.
FISHING DEVICE.
APPLICATION FILED JAN. 28, 1914.
1,138,541.
Patented May 4, 1915.
2 SHEETS—SHEET 2.
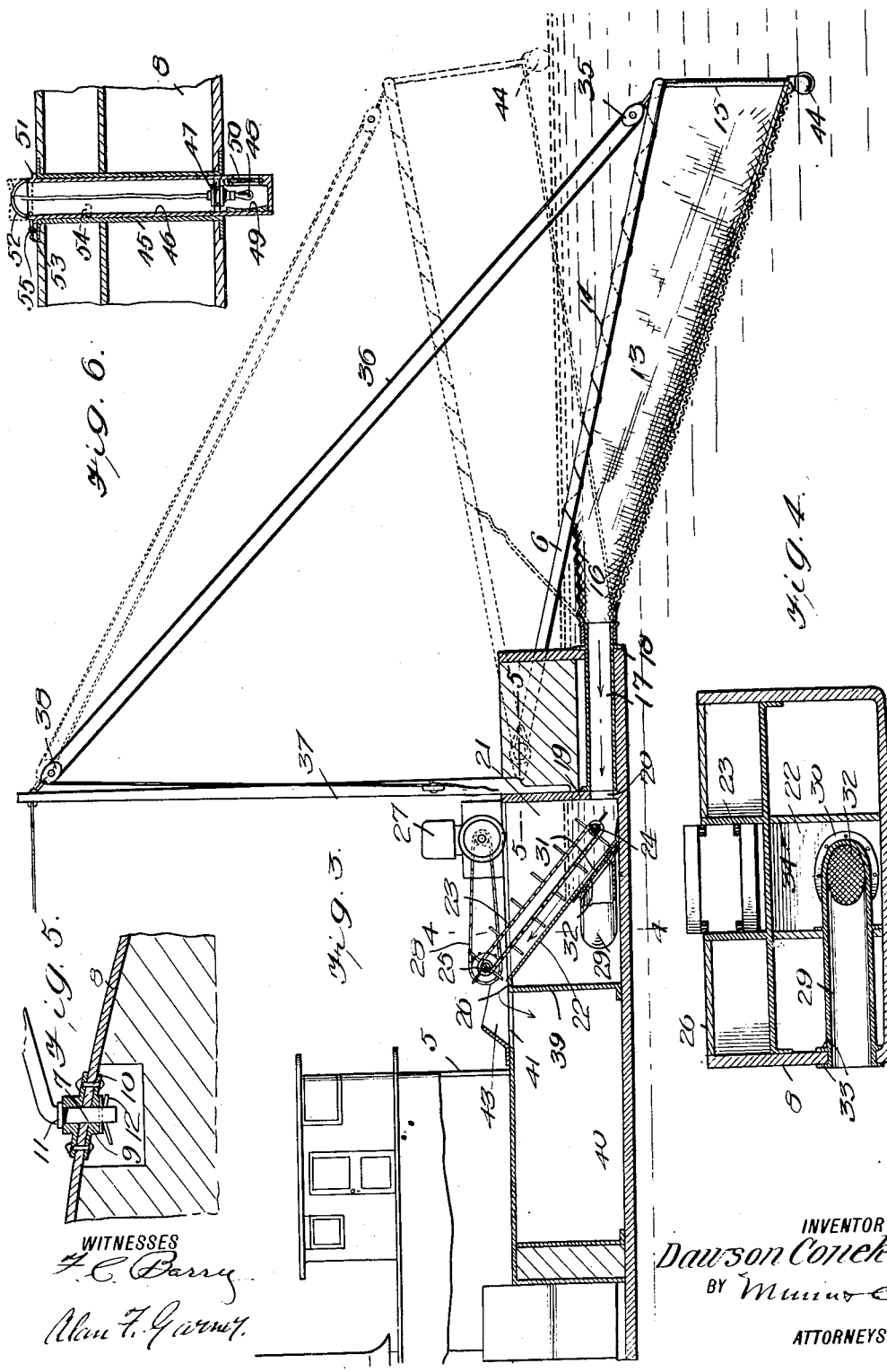
INVENTOR
Dawson Conekin
BY
ATTORNEYS
WITNESSES

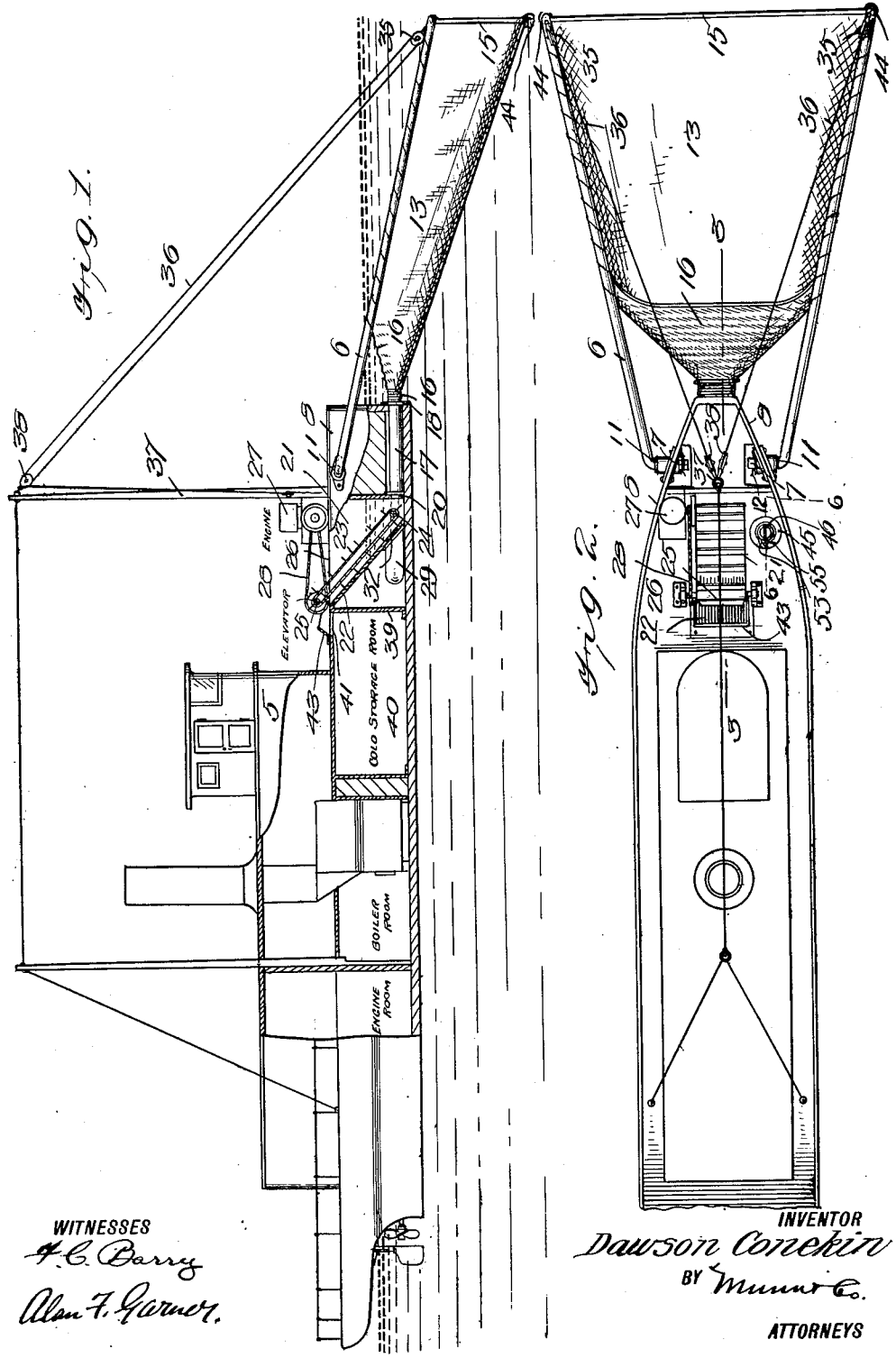

UNITED STATES PATENT OFFICE.

DAWSON CONEKIN, OF ST. PETERSBURG, FLORIDA.

FISHING DEVICE.

1,138,541.  Specification of Letters Patent.  Patented May 4, 1915.

Application filed January 28, 1914. Serial No. 814,974.

*To all whom it may concern:*

Be it known that I, DAWSON CONEKIN, a citizen of the United States, and a resident of St. Petersburg, in the county of Pinellas and State of Florida, have invented a new and useful Improvement in Fishing Devices, of which the following is a specification.

This invention relates to a fishing apparatus, and one of the principal objects thereof is to provide a construction and arrangement of means whereby fish may be automatically taken from the water and deposited in a cold storage receptacle, without the necessity of manually handling the fish and with a great saving of expense and labor.

Another object of the invention is to provide a device of the class described, which will be simple, durable, efficient in operation and inexpensive to manufacture.

With these and other objects in view, which will become apparent as the description proceeds, the invention resides in the construction, combination and arrangement of parts, hereinafter more fully described and claimed, and illustrated in the accompanying drawings in which like characters of reference indicate like parts throughout the several figures, of which, Figure 1 represents a side elevational view of a vessel, partially in section, equipped with the fishing apparatus, Fig. 2 represents a top plan view thereof, Fig. 3 represents a detail, vertical, longitudinal, sectional view of the prow of the vessel and the apparatus attached thereto, the net being shown in raised position in dotted lines, Fig. 4 represents a vertical, transverse, sectional view, taken on the plane indicated by the line 4—4 of Fig. 3, Fig. 5 represents a detail, horizontal, fragmentary, sectional view, taken on the plane indicated by the line 5—5 of Fig. 3, and Fig. 6 represents an enlarged vertical sectional view, taken on the plane indicated by the line 6—6 of Fig. 2.

Referring more particularly to the drawings, the numeral 5 indicates a vessel which may be steam-driven or propelled in any other suitable manner, and at 6 is indicated a pair of bow outriggers which extend forward of the vessel in a divergent manner and at their rear ends are bent inwardly as at 7, (see Fig. 5) and extend through the sides of the vessel near its bow, and are rotatably supported by means of inner and outer bearing plates 9 through which they extend, which plates are connected by bolts or other fastening means 10, extending through the plates and through the sides of the vessel. The inbent portions are provided with collars 11 which bear against the outer bearing plates, and through the inner ends of the inbent portions extend cotter pins or other removable fastening means 12, whereby the outriggers may be removed from their bearings, should occasion arise.

The outriggers support a net 13 which at its longitudinal edges is lashed as at 14 to the outriggers, and the net depends below the outriggers, and may be attached at its forward end to a substantially rigid bow-shaped element 15, which at its ends is secured to the forward ends of the outriggers, and which serves to maintain the shape of the net against the action of waves or currents in the water. The net tapers toward its rear end and at that end is formed a substantially funnel shaped extensible throat 16 which is adapted to fit onto the forward end of a pipe 17 extending medially of the vessel, and through the bow beneath the water. The pipe at its forward end is provided with a flange 18 by which it may be secured to the vessel and at its rear end abuts against a bulk-head 19 through which an opening 20 is provided in alinement with pipe 17, said opening forming an inlet, to what may be termed an elevator chamber or compartment 21, formed in the hold of the vessel, and provided with an inclined rear wall 22.

Arranged so that its blades will travel upwardly along the rear wall 22, is a conveyer 23, supported at its lower end on a roller 24 positioned transversely of compartment 21, and supported at its upper end on a roller 25, journaled above the deck 26 of the vessel. The roller 25 may be driven by means of an engine 27 arranged in a suitable position on the deck of the vessel and connected by means of a chain or belt 28 with the roller 25. The outlet of chamber 21 comprises a bent tube or pipe 29, which, at its forward end, is secured by means of a flange 30, to the rear wall 22 of compartment 21, near the lower end thereof, said wall being provided with an opening 31, alining with the forward end of pipe 29, and the pipe, at its forward end, is provided with a screen 32, adapted to blockade said opening against the passage of fish therethrough, but to allow of the water in compartment 21, passing through the screen and through the pipe 29 to the exterior of the vessel, the rear end of pipe 29 extending through one of the sides 8 of the vessel, said pipe at its rear end provided with flanges 33 for providing a water tight joint at the point where the pipe passes through the vessel side.

Compartment 21 may, if desired, extend the entire width of the vessel, or it may, as shown, be of a width equal to the width of the conveyer 23, in this instance, the side walls of compartment 21 being formed by a pair of partitions 34.

The forward ends of the outriggers 6 are provided with blocks 35, through which a tackle 36 is adapted to play and to the foremast 37 of the vessel is also secured blocks 38 through which the tackle extends, whereby the outriggers may be raised or lowered, so as to position the net at the required depth.

The net is normally positioned so that the forward end thereof will be below the surface of the water, as indicated, and as the vessel is driven forward, the fish engaged by the net will be brought upwardly through the throat 16 of the pipe 17, and into the compartment 21, from which they will be carried by the elevator which is driven in the direction indicated by the arrow in Fig. 3, upwardly along the inclined rear wall 22, and will be dumped over a second bulkhead 39, into a cold storage chamber or compartment 40 of which the bulk-head forms the front wall, said chamber being kept at a low degree of temperature by any suitable means. The fish enter the cold storage chamber through an opening 41 in the deck of the vessel, disposed adjacent the upper end of the rear wall 22, and an inclined baffle plate 43 is arranged to surround said opening on three sides to insure projection of the fish through the opening 41. The level of the water in compartment 21 will remain constant and the circulation of the water through the compartment will be insured by reason of the outlet pipe 29, being placed so that the water entering through the pipe 17 will pass through the lower end of the compartment and out through the pipe 29, thus creating a current in the compartment which would project the fish against the lower portion of the inclined rear wall 22, in position to be engaged by the blades of the conveyer.

At the bottom of the net on bow 15 are positioned electric lights 44 which will tend to primarily attract the fish, and then to blind them, so that they will not attempt to dodge the net 13.

Extending vertically through the vessel near the prow, is a tube 45 provided at its ends with flanges counter-sunk into the deck and the bottom respectively of the vessel, and a second tube 46 is slidably positioned within the first, and is closed at its bottom and adapted to project below the bottom of the vessel. Suspended in the lower end of tube 46 by means of a spider 47, is an electric or other suitable light 48 whose rays may be reflected by means of the reflector 49 positioned in the tube, toward the prow of the vessel through the glass 50. The light is intended to be used primarily, while the vessel is running with the net up and by shining through the water ahead of the vessel, indicates to the look out the presence of any schools of fish which may be in the neighborhood or path of the vessel.

As before stated, tube 46 is slidably positioned in tube 45, and is limtied in its downward movement by the flange 51. Handles 52 are provided on the inner tube by means of which the latter may be raised when desirable, and a pivoted dog 53 is adapted to fit at its free ends in a groove 54 cut in the outer surface of the tube for holding the latter when in raised position. A retractable spring 55 normally holds the dog in contact with the inner tube, said dog being adapted to fit over flange 51 when the tube is in lowered position.

Although I have described the preferred embodiment of my invention, I may desire to make such changes in the construction, combination and arrangement of parts, as do not depart from the spirit of the invention and the scope of the appended claims.

I claim:

1. A fishing device including a vessel having a compartment therein provided with an inclined rear wall, a fishing net, a pipe communicating at one end with the net and at the other end with said compartment whereby the full volume of water entering the pipe from the net may be directed through the compartment against said rear wall, means for lifting fish from the rear wall, a second pipe communicating at one end with the compartment through an opening in said rear wall and at the other end with the outside of the vessel, and a screen disposed over the opening in said rear wall.

2. A fishing device including a vessel having a compartment therein, a fishing net having a restricted throat means for directing the full volume of water from said throat into said compartment, means for allowing the exit of water from the compartment whereby a current including the full volume of water from said restricted throat may be established through said compartment, means in the compartment for retarding the passage of fish therethrough with the current, and means adapted to co-act with the retarding means for raising fish from the compartment.

3. A fishing device including a vessel having a compartment therein, a fishing net having a restricted discharge opening, means for establishing a direct current comprising the full volume of water from said restricted discharge opening through said compartment, means for retarding the passage of fish through the compartment with the current, and means for raising the fish from the compartment.

DAWSON CONEKIN.

Witnesses:
 H. B. SMITZ,
 E. N. HANEFRIED.